United States Patent Office 3,361,716
Patented Jan. 2, 1968

3,361,716
POLYESTERS OF DECAHYDRO-BIS-(HYDROXY-METHYL)-NAPHTHALENE
Fred M. Parham, Kinston, N.C., assignor to E. I. du Pont de Nemours and Company, Wilmington, Del., a corporation of Delaware
No Drawing. Original application Feb. 1, 1962, Ser. No. 170,523, now Patent No. 3,280,198, dated Oct. 18, 1966. Divided and this application Feb. 28, 1966, Ser. No. 565,636
16 Claims. (Cl. 260—47)

ABSTRACT OF THE DISCLOSURE

Moldable linear polyesters and copolyesters of the decahydro - bis - (hydroxymethyl)naphthalenes or ester forming derivatives thereof and dicarboxylic acids having a six membered ring and containing from 8 to 26 carbon atoms, or ester forming derivatives thereof. Also fibers, films, and other shaped articles from the foregoing polymers.

---

This is a division of my application Ser. No. 170,523 filed Feb. 1, 1962. The invention relates to a novel class of moldable linear polyesters and fibers, films, and other shaped articles produced therefrom as well as to the novel glycols from which the polyesters are prepared. This application is a division of my copending U.S. application Ser. No. 170,523, now U.S. Patent 3,280,198.

I have found that the class of decahydro-bis-(hydroxymethyl)naphthalenes, $C_{10}H_{16}(CH_2OH)_2$, i.e.,

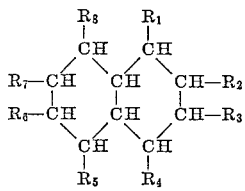

wherein two of the R substituents are —CH₂OH and the remainder are hydrogen, can be readily prepared and that these novel glycols have excellent utility in the preparation of linear polyesters. The polyesters, which are prepared by reacting dicarboxylic acids containing from 8 to 26 carbon atoms, or ester-forming derivatives thereof, with a decahydro-bis-(hydroxymethyl)naphthalene or ester-forming derivative thereof, are useful in the preparation of molding compositions; and the higher melting products are especially advantageous for the preparation of fibers and films.

The novel glycols can be readily obtained from the corresponding naphthalenedicarboxylic acids via reduction of the aromatic naphthalene nucleus to the alicyclic decahydronaphthalene nucleus and reduction of the carboxyl groups to hydroxymethyl groups. Reduction of the naphthalene nucleus is conveniently achieved by hydrogenation, using ruthenium as a catalyst; while reduction of the carboxyl groups is readily attained by hydrogenation with a catalyst such as copper chromite or by reaction with lithium aluminum hydride. The process is applicable to each of the ten position isomers of naphthalenedicarboxylic acid, the corresponding glycol products being the isomeric decahydro-1,2- 1,3-, 1,4-, 1,5-, 1,6-, 1,7-, 1,8-, 2,3-, 2,6-, and 2,7-bis-(hydroxymethyl)naphthalenes. Each of the position isomers obtained by complete reduction of the starting material naphthalenedicarboxylic acid in this way is actually found to consist of a mixture of various cis- and trans- forms of the respective position isomers; however since the mixtures of cis- and trans-glycol forms have excellent utility in the preparation of polyesters, the purification of the reduction product need not include separation procedures for the specific geometrical isomers unless it is specifically desired to prepare a polyester from a single isomer.

In accordance with the present invention, the preferred glycols are those in which the hydroxymethyl groups are separated by a chain of at least four nuclear alicyclic carbon atoms. These glycols are the decahydro-1,7-, 1,6-, 1,5-, 1,4-, 2,7-, and 2,6-bis(hydroxymethyl)naphthalenes. The latter four, which are symmetrically substituted as illustrated by the formulas below, are especially preferred, decahydro-2,6-bis(hydroxymethyl)naphthalene being the one which provides the best polyester fiber properties.

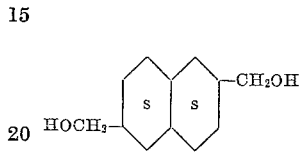 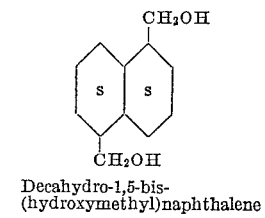

Decahydro-2,6-bis-(hydroxymethyl)naphthalene    Decahydro-1,5-bis-(hydroxymethyl)naphthalene

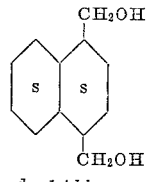 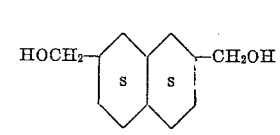

Decahydro-1,4-bis-(hydroxymethyl)naphthalene    Decahydro-2,7-bis-(hydroxymethyl)naphthalene In the above formulas, the symbol s indicates that the ring is saturated (alicyclic).

The novel linear polyesters of the invention are characterized by possessing recurring units of the following formula:

$$-O-CH_2-C_{10}H_{16}-CH_2-O-\underset{\underset{O}{\|}}{C}-A-\underset{\underset{O}{\|}}{C}-$$

in which A is a divalent organic radical containing from 6 to 24 carbon atoms, corresponding to the radical A in the starting material dicarboxylic acid, A(COOH)₂. Preferably, A contains at least one 6-membered carbocyclic nucleus and the carboxyl groups are separated by a chain of at least three nuclear carbon atoms. Thus, A may be an arylene, aralkylene, or cycloalkylene radical of 6 to 24 carbon atoms derived from the dicarboxylic acid of the formula A(COOH)₂, the carboxyl groups being attached in positions other than ortho positions on the ring.

The starting material dicarboxylic acids from which the polyesters are prepared may be in the form of their esterforming derivatives, i.e., their carbonyl halides, anhydrides, salts, or esters, particularly their esters with the lower aliphatic alcohols or with phenol. 4,4'-bibenzoic acid is an example of a dicarboxylic acid which may be used with the novel glycols to form polyesters; and this acid is indeed particularly preferred for the purpose of producing polyesters suitable for spinning textile filaments. Other examples of suitable acids include 2,2'- and 3,3'-dimethyl-4,4'-bibenzoic acid, 2,2'-dibromo - 4,4' - bibenzoic acid, bis - (4 - carboxyphenyl)methane, 1,1- and 1,2 - bis (4 - carboxyphenyl)ethane, 2,2 - bis(4 - carboxyphenyl) propane, 1,2 - bis(4 - carboxyphenoxy)ethane, bis - 4-carboxyphenyl ether, bis-4-carboxyphenyl sulfide, bis-4-carboxyphenyl ketone, bis-4-carboxyphenyl sulfoxide, bis-4-carboxyphenyl sulfone, 2,8-dibenzofurandicarboxylic acid, terephthalic acid, methylterephthalic acid, 2,5- or 2,6-dimethylterephthalic acid, chloroterephthalic acid, 2,5-dichloroterephthalic acid, fluoroterephthalic acid, isophthalic acid, 5-chloro-isophthalic acid, 5-t-butylisophthalic acid, the naphthalenedicarboxylic acids and especially the 1,4-, 1,5-, 2,6-, and 2,7-isomers, phenylenediacetic acid, 4-carboxyphenoxyacetic acid, m- and p-terphenyl-4,4''-dicarboxylic acid, dodecahydrobibenzoic acid, hexahydroterephthalic acid, bicyclo(2·2·2)octane-1,4-dicarboxylic acid, 2,6- and 2,7-decalindicarboxylic acid, 4,4'-stilbenedicarboxylic acid, and octadecahydro-m-terphenyl-4,4''-dicarboxylic acid. The divalent A radical is preferably composed primarily of carbon and hydrogen but may contain, in addition to the two carboxyl groups, other nonhydrocarbon components or substituents which are inert in the polyesterification reaction. For example, halogen substituents may be present. The radical A may also be a chalkogen-containing radical wherein each chalkogen atom is bonded to carbon or a different chalkogen atom, and no carbon is bonded to more than one chalkogen atom. Thus, the repeating units may contain ether, carbonyl, sulfide, sulfoxide, or sulfonyl radicals. Mixtures of the dicarboxylic acids may be employed.

The polyesters of the invention are prepared by reacting a dicarboxylic acid or an ester-forming derivative thereof, as described above, with a decahydro-bis-(hydroxymethyl)naphthalene or an ester-forming derivative of the glycol. By an ester-forming derivative of the glycol is meant a derivative of a decahydro-bis-(hydroxymethyl) naphthalene containing functional groups equivalent to the hydroxyl group in their ability to react with the carboxyl group, such as esters of the glycol with acetic acid or other lower aliphatic acids.

A convenient method for preparing the polymers involves reaction of an alkyl ester of a dicarboxylic acid with the decahydro-bis(hydroxymethyl)naphthalene in an ester interchange reaction followed by polycondensation at high temperature and at a low partial pressure of the glycol, until a polymer of the desired molecular weight is produced. In carrying out the ester interchange reaction, at least one molecular proportion of decahydro-bis-(hydroxymethyl)naphthalene per molecular proportion of the dicarboxylic ester should be used, preferably about 1.5 to 1.8 mols of the glycol per mol of the ester. It is desirable to employ an ester of the dicarboxylic acid formed from an alcohol or phenol with a boiling point considerably below that of the decahydro-bis(hydroxymethyl)naphthalene so that the former can be easily removed from the reaction zone by distillation. It is preferred to use the methyl or ethyl esters, as these esters are formed from alcohols which, because of their relatively low boiling points, are easily separated by distillation from the glycol. Heating should be above the melting point of the reaction mixture and above the boiling point of the alcohol or phenol to be displaced. Heating should be effected under conditions such that the displaced alcohol or phenol can be removed from the reaction zone, usually by means of conventional distillation eqiupment. The heating is usually at atmospheric pressure, but higher or lower pressures may be used if desired. The ester interchange reaction is advantageously carried out in the presence of ester interchange catalysts such as sodium hydrogen hexabutoxytitanate, tetra-alkyl titanates such as tetraisopropyl titanate, manganous acetate, calcium acetate, litharge, sodium methoxide, or other suitable ester interchange catalysts as described in the literature relating to preparation of polyesters.

Following the ester interchange reaction, heating is continued under reduced pressure until the excess glycol is removed and the polymerization reaction has proceeded to the desired degree. The final stages of polymerization may be carried out with polymer in the molten state or, if desired, the reaction may be completed by solid phase polymerization. The polymerization reaction may be carried out in the presence of catalysts such as antimony trioxide, litharge, zinc acetate, or other suitable polycondensation catalysts as described in the literature. Sodium hydrogen hexabutoxytitanate and the tetra-alkyl titanates such as tetraisopropyl titanate are examples of catalysts which may be used for both the ester interchange and polymerization steps.

As used herein the term "polyester" is intended to include not only homopolyesters but also copolyesters, terpolyesters, and the like.

While the preferred embodiment of the invention comprises polyesters in which all, or substantially all (i.e., greater than 90%), of the recurring structural units consist of decahydro-bis(hydroxymethyl)napthalene esters of dicarboxylic acids, it is to be understood that the invention also comprises polyesters in which residues of other hydroxy compounds are present. In general, it is preferred that at least about 50 mol percent of the hydroxy component of the polyester is a decahydro-bis(hydroxymethyl) naphthalene, although of course smaller proportions can be employed. By "hydroxy component" of the polyester is means the sum of all the hydroxy-substituted compounds which would be formed by hydrolysis of the carbonyloxy linkage in the polymer chain. The remainder of the hydroxy component of the polyester, up to about 50 mol percent, may be any suitable dihydroxy compound or hydroxycarboxylic acid. Examples of such compounds include ethylene glycol, propylene glycol, butylene glycol, 2,2-dimethylpropylene glycol, 2-methyl-2-ethylpropylene glycol, 2-methyl-2-propylpropylene glycol, 2,2,3,3,4,4-hexafluoro-1,5-pentanediol, hexamethylene glycol, decamethylene glycol, diethylene glycol, ethylene thiodiglycol cis- or trans-hexahydro-p-xylylene glycol, cis- or trans-quinitol, tetramethyl-1,3-cyclobutanediol, 1,1-bis(hydroxymethyl)cyclohexane, 4 - (2 - hydroxyethyl)-benzoic acid, and 4-(2-hydroxyethoxy)benzoic acid.

The remainder of the hydroxy component may also be a bisphenol. A convenient method of preparing such copolyesters involves (A) preparation of a homopolyester of a decahydro-bis(hydroxymethyl)naphthalene and a dicarboxylic acid as described above, (B) preparation of a homopolyester of the bisphenol with the dicarboxylic acid, e.g. by reacting the bisphenol with the diphenyl ester of the acid in the presence of sodium acetate as a catalyst, and (C) melt blending the decahydro-bis(hydroxymethyl) naphthalene polyester and the bisphenol polyester in the desired proportions under an atmosphere of nitrogen. The blended mixture initially forms a block copolyester, but if the mixture is held an hour or so in the melt the copolyester becomes random. The catalysts present in the homopolyester also serve as catalysts for the randomization of the copolyester. Suitable bisphenols for the preparation of such copolyesters include hydroquinone, resorcinol, 4,4'-dihydroxybiphenyl, 3,3'-dibromo-4,4'-dihydroxybiphenyl, bis(4 - hydroxyphenyl)methane, 2,2-bis(4 - hydroxyphenyl) - propane, 2,2-bis(3,5-dichloro-4-hydroxyphenyl)propane, 1,4-bis(2 - hydroxyethoxy)benzene, bis(4 - hydroxyphenyl)ether, bis(4-hydroxyphenyl) sulfone, bis(4-hydroxyphenyl) ketone, bis(4-hydroxyphenyl) sulfoxide, and 1,4-bis(2-hydroxyethyl)benzene.

Hydrocarbons substituted with two hydroxy groups, or substituted with one hydroxy group and one carboxylic acid group, are normally preferred as copolymeric hydroxy components; however, halogen or chalkogen modifiers may also be present, as described above with respect to the dicarboxylic acid. A minor amount of a dicarboxylic acid or a hydroxy component carrying a metallic sulfonate salt, carboxylate salt, phosphonate salt, or the like may also be present.

In its broadest scope, the invention therefore comprehends highly polymeric linear carbonyloxy polyesters of bifunctional compounds containing two functional groups selected from the class consisting of (a) hydroxy groups and (b) carboxylic acid groups, said bifunctional compounds consisting of (A) hydroxy component containing at least about 50 mol percent of a decahydro-bis(hydroxymethyl)-naphthalene and (B) dicarboxylic acid component containing from 8 to 26 carbon atoms including at least one 6-membered carbocyclic nucleus in which the carboxyl groups are separated by a chain of at least three nuclear carbon atoms. Within the broad range of useful polymers, which includes polyesters melting as low as about 100° C. and as high as about 325° C., it is generally considered that those polyesters melting below about 200° C. are suitable for molding compositions while the higher melting polyesters have a similar utility but are also especially advantageous for the extrusion of fibers and films. Polyesters having an intrinsic viscosity of at least about 0.2 are considered to be of sufficiently high molecular weight for utility in forming molded articles as well as films. For use in extruding fibers and filaments, polycondensation is usually continued until the intrinsic viscosity is at leeast about 0.3.

The following examples will serve to describe the preparation of the decahydro-bis(hydroxymethyl)naphthalenes, as well as typical polyesters and copolyesters derived therefrom. The examples are not intended to be limitative.

In the examples, "polymer melting temperature" is defined as the gross melting temperature determined by heating a polymer sample slowly and observing the lowest temperature at which a slight pressure causes permanent deformation of the sample. "$T_g$," the "second order transition temperature," is defined as the temperature at which a discontinuity occurs in the curve of a first derivative thermodynamic quantity with temperature. It is correlated with yield temperature and polymer fluidity and can be observed from a plot of density, specific volume, specific heat, sonic modulus or index of refraction against temperature. $T_g$ is sometimes also known as the "glass transition temperature" because it is the temperature below which the polymer exhibits glasslike behavior; above $T_g$ the polymer is somewhat more rubberlike. A convenient method for determining $T_g$ for a given sample of polymer is given by Pace in his U.S. Patent 2,556,295 (col. 3, line 24 to col. 4, line 19).

EXAMPLE 1.—PREPARATION OF DECAHYDRO-BIS(HYDROXYMETHYL)NAPHTHALENES

A. *Decahydro-2,6-bis(hydroxymethyl)naphthalene*

To a solution of 200 g. of dimethyl 2,6-naphthalenedicarboxylate in 800 cc. of cyclohexane is added 9 g. of finely divided ruthenium on carbon, after which the mixture is hydrogenated for 6 hours at 150° C. under an atmosphere of 1800 p.s.i. of hydrogen. The solution is then worked up by fractional distillation through a 36-inch column, taking the center cut (over 90% of the distillate) at 138–140° C. (0.2 mm. of mercury) as the desired product, dimethyl decahydro-2,6-napthalenedicarboxylate. The ester has a melting point of 42–56° C. and a saponification equivalent of 127.7 (theoretical 127.1).

152 grams of dimethyl decahydro-2,6-naphthalenedicarboxylate is dissolved in 400 cc. of tetrahydrofuran and the solution is added dropwise to a slurry of 31 g. of lithium aluminum hydride in 400 cc. of tetrahydrofuran at room temperature. After the addition is complete, the mixture is refluxed one hour. The solution is then cooled in Dry Ice-acetone atnd water is added dropwise to hydrolyze the salt, after which dilute hydrochloric acid is added to dissolve the resulting inorganic hydroxides. 200 cc. of ether is added, after which the organic layer is separated and the volatile solvents are distilled from it. The remaining material is distilled, and the center cut (80% of the distillate, B. P. 198° C. at 7 mm. of mercury) is taken as the product, decahydro-2,6-bis(hydroxymethyl)naphthalene.

B. *Decahydro-1,4-bis(hydroxymethyl)naphthalene*

The procedure described above for preparation of decahydro-2,6-bis(hydroxymethyl)naphthalene is repeated, employing dimethyl 1,4-naphthalenedicarboxylate as a starting material and reducing it to dimethyl decahydro-1,4-naphthalenedicarboxylate (B.P. 170–178° C. at 7 mm.) with hydrogen in the presence of ruthenium on carbon, followed by treatment with lithium aluminum hydride to form decahydro-1,4-bis(hydroxymethyl)naphthalene (B.P. 140–140° C. at 0.5 mm.).

(C) *Decahydro-2,7-bis(hydroxymethyl)naphthalene*

The procedure is repeated again, employing dimethyl 2,7-naphthalenedicarboxylate as a starting material and reducing it to dimethyl decahydro-2,7-naphthalenedicarboxylate with hydrogen in the presence of ruthenium on carbon, followed by treatment with lithium aluminum hydride to form decahydro-2,7-bis(hydroxymethyl)naphthalene (B.P. 170–175° C. at 6 mm.).

The following glycols are produced by the same procedure, in each instance hydrogenating the corresponding dimethyl naphthalenedicarboxylate isomer over ruthenium on carbon to produce the corresponding dimethyl decahydro-naphthalenedicarboxylate isomer, which is then treated with lithium aluminum hydride to form the glycol:

(D) *Decahydro-1,2-bis(hydroxymethyl)naphthalene*
(E) *Decahydro-1,3-bis(hydroxymethyl)naphthalene*
(F) *Decahydro-1,5-bis(hydroxymethyl)naphthalene*
(G) *Decahydro-1,6-bis(hydroxymethyl)naphthalene*
(H) *Decahydro-1,7-bis(hydroxymethyl)naphthalene*
(I) *Decahydro-1,8-bis(hydroxymethyl)naphthalene*
(J) *Decahydro-2,3-bis(hydroxymethyl)naphthalene*

PURIFICATION OF THE 2,6-ISOMER BY RECRYSTALLATION

The procedure for preparing decahydro-2,6-bis(hydroxymethyl)naphthalene is repeated, except that instead of distilling the crude glycol product, it is recrystallized from a solvent comprising equal parts of ether and methanol, cooled with Dry Ice. The first crop of crystals, amounting to 55% yield based on the dimethyl decahydro-2,6-naphthalenedicarboxylate starting material, has a melting point of 94–104° C.

EXAMPLE 2.—PREPARATION OF POLY(DECAHYDRONAPHTHALENEDIMETHYLENE 4,4'-BIBENZOATES)

(A) *Poly(decahydronaphthalene-2,6-dimethyl 4,4'-bibenzoate)*

Into a small polymer tube is placed 15 g. of dimethyl 4,4'-bibenzoate (0.055 mol), 18.7 g. of decahydro-2,6-bis(hydroxymethyl)naphthalene (0.095 mol) and 5 drops of a solution of 16 g. of NaHTi(OBu)$_6$ in 200 cc. of n-butanol as a catalyst. The ingredients are melted and a capillary for nitrogen flow is inserted into the polymer tube. Ester exchange is carried out for 2 hours at 220–230° C., after which the temperature is raised to 285° C. and vacuum is applied gradually until the pressure is reduced to 0.5 mm. of mercury. After 4 hours of polymerization at this temperature and pressure with a continuous slow stream of nitrogen maintained through the tube, a white solid having an intrinsic viscosity of about 0.4 and a polymer melting temperature of 215° C. is produced.

The polymeric material prepared as described above is powdered and then heated for 4 hours under a stream of nitrogen while the temperature of the nitrogen is gradually increased from 200° C. to 260° C. At the conclusion of the solid phase polymerization reaction, the intrinsic viscosity of the polymer is 0.7 and the polymer melting temperature is 265° C.

(B) *Poly(decahydronaphthalene-1,4-dimethylene 4,4'-bibenzoate)*

The procedure described above for preparation of poly-(decahydronaphthalene-2,6-dimethylene 4,4'-bibenzoate) is repeated through the melt polymerization step (omitting the solid polymerization step), substituting decahydro-1,4-bis(hydroxymethyl)naphthalene as the starting material in place of decahydro-2,6-bis(hydroxymethyl)naphthalene. A white solid having an intrinsic viscosity of about 0.4 and a polymer melting temperature of 145–150° C. is formed.

(C) *Poly(decahydronaphthalene-2,7-dimethylene 4,4'-bibenzoate)*

Dimethyl 2,7-naphthalenedicarboxylate is reduced to dimethyl decahydro-2,7-naphthalenedicarboxylate as described in Example 1 and the unpurified ester is reduced to decahydro-2,7-bis(hydroxymethyl)naphthalene as otherwise described in Example 1. After distillation the glycol is used as the starting material in place of decahydro-2,6-bis(hydroxymethyl)naphthalene in the procedure described above for preparation of poly(decahydronaphthalene-2,6-dimethylene 4,4'-bibenzoate) through the melt polymerization step, omitting the solid polymerization step. A white solid having an intrinsic viscosity of about 0.4 and a polymer melting temperature of 135° C. is produced.

By substituting the glycols of items D through J of Example 1 in place of decahydro-2,6-bis(hydroxymethyl) naphthalene as the starting materials in the procedure described above for preparation of poly(decahydronaphthalene-2,6-dimethylene 4,4'-bibenzoate), the following polymers are prepared:

(D) *Poly(decahydronaphthalene-1,2-dimethylene 4,4'-bibenzoate)*
(E) *Poly(decahydronaphthalene-1,3-dimethylene 4,4'-bibenzoate)*
(F) *Poly(decahydronaphthalene-1,5-dimethylene 4,4'-bibenzoate)*
(G) *Poly(decahydronaphthalene-1,6-dimethylene 4,4'-bibenzoate)*
(H) *Poly(decahydronaphthalene-1,7-dimethylene 4,4'-bibenzoate)*
(I) *Poly(decahydronaphthalene-1,8-dimethylene 4,4'-bibenzoate)*
(J) *Poly(decahydronaphthalene-2,3-dimethylene 4,4'-bibenzoate)*

When the procedure is repeated again, employing as the glycol starting material a mixture of 92 mol percent of the 2,6-glycol and 8 mol percent of 2,7-glycol, the corresponding copolyester is produced.

Flexible films of each of the above polymers are prepared by melt-pressing the polymer.

EXAMPLE 3.—FIBERS OF POLY(DECAHYDRONAPHTHALENE-2,6-DIMETHYLENE 4,4'-BIBENZOATE)

A molten sample of the poly(decahydronaphthalene-2,6-dimethylene 4,4'-bibenzoate) of Example 2 is spun into filaments, using conventional techniques. The filaments are oriented by drawing them around a pin maintained at 157° C., using a draw ratio of 2.5X. The resulting fibers have a tenacity of 1.9 g.p.d., a break elongation of 8%, and a modulus of 64 g.p.d. The fibers are found to have excellent ability to recover from low levels of extension. Values for "tensile strain recovery" (TSR) and "moduli relaxation index" (MRI) are 78% and 0.036, respectively. Another sample of the filaments is oriented 2X around a pin maintained at 157° C. These filaments have a tenacity of 1.6 g.p.d., an elongation of 24%, a modulus of 50 g.p.d., a TSR of 72%, an MRI of 0.04, and a $T_g$ of 150° C.

The TSR of a yarn sample is determined by mounting a 10-inch length of the yarn on a tensile tester with recording chart (commercialy available from the Instron Engineering Corporation, Quincy, Mass.) and also equipped with a circulating water bath which can be raised and lowered. The water bath, maintained at 40° C., is raised to immerse the yarn. After the yarn has been immersed for 2 minutes without tension it is stretched, in the water bath, at an elongation rate of 1 inch per minute. Upon reaching the desired total elongation, the sample is held at constant length for an additional 2 minutes and the water bath is removed. The load on the yarn is then reduced to a value of 0.042 g.p.d. and the yarn is allowed to retract. Percent recovery is calculated from the formula:

$$\frac{\text{units of retraction}}{\text{units of elongation}} \times 100$$

This procedure is carried out for elongations of 0.5, 1, 2, and 3%, and a graph is prepared by plotting the percent recovery against total elongation in the range 0–3%. TSR values are average percent recovery values from the rangfe 0–3% elongation which may be determined from the graph by usual graphical averaging procedures.

Yarns having TSR values of 60% are considered to have good tensile recovery, while yarns exhibiting TSR values of 70% and above are considered quite superior.

The MRI of a yarn sample is determined by mounting a 10-inch length of the yarn on a tensile tester of the above type, except that the tester is additionally equipped with a tube heater surrounding the yarn sample. The yarn is first heated for 4 minutes at 70° C. with the tube heater, after which it is stretched while hot to an extension of 1% ±0.05%. Upon reaching 1% elongation, the sample is held at constant length for about 1 minute, still at 70° C., during which time the force required to maintain the yarn at this extension is recorded on the chart. The cross head of the tensile tester is then returned to its original position, leaving the yarn with a small amount of slack. To circulating water bath, maintained at 70° C., is raised so that the yarn sample is submerged. After the sample has been heated in water for 4 minutes at this temperature, the slack is taken up and the sample is stretched again to 1% ±0.05% elongation. The cross head is then finally returned again to its original position. Data are then taken from the chart of the tensile tester to calculate the dry and wet moduli and the loss factor, as follows:

$$G_{(dry)} = \frac{F_a}{\text{denier}} \times \frac{100}{\text{percent extension}}$$

$$G_{(wet)} = \frac{F_a'}{\text{denier}} \times \frac{100}{\text{percent extension}}$$

$$L = \frac{F_a - F_b}{F_a}$$

$$MRI = \frac{G_{(dry)}}{G_{(wet)}} \times L$$

where $G_{(dry)}$ is the dry modulus and $G_{(wet)}$ is the wet modulus, $F_a$ is the initial force required to achieve 1% elongation in the dry yarn and $F_a'$ is the initial force required to achieve 1% elongation in the wet yarn, $F_b$ is the force required to maintain the dry yarn at constant 1% elongation 45 seconds after 1% elongation is initially achieved, and L is the loss factor. Low values of MRI are indicative of a high predicted fabric recovery, especially values below 0.2. Comparative MRI values for commercial 6–6 nylon and polyethylene therephthalate fibers are 0.9 and 0.2, respectively.

EXAMPLE 4.—COPOLYESTER FIBERS AND FILMS OF IMPROVED DYEABILITY WITH BASIC DYES

The procedure described in Example 2 for preparation of poly(decahydronaphthalene-2,6-dimethylene 4,4'-bibenzoate) is repeated, substituting in place of the dimethyl 4,4'-bibenzoate a mixture of 0.0536 mol of dimethyl 4,4'-bizenzoate and 0.0014 mol of sodium 3,5 - di(carbomethoxy)benzenesulfonate. The product, poly[decahydronaphthalene-2,6-dimethylene 4,4'-bibenzoate/5-(sodium sulfo)isophthalate], 97.5/2.5 mol percent, has a polymer melting temperature of 265° C. and an intrinsic viscosity of 0.7. Films melt pressed from the resulting polymer exhibit greatly enhanced dyeability with Fuchsine SBP dye (C.I. 42,510) and other basic dyes as contrasted with the corresponding homopolyester of Example 2, which has virtually no affinity for these basic dyes. Fibers produced from this polymer by melt spinning and drawing have a TSR of 75% and are readily dyeable with Fuchsine SBP dye.

EXAMPLE 5.—COPOLYESTER FIBERS AND FILMS OF IMPROVED DYEABILITY WITH DISPERSE DYES

The procedure described in Example 2 for preparation of poly(decahydronaphthalene-2,6-dimethylene 4,4'-bibenzoate) is repeated, substituting in the place of the dimethyl 4,4'-bibenzoate a mixture of 0.0495 mol of dimethyl 4,4'-bibenzoate and 0.0055 mol of dimethyl dodecahydro-4,4'-bibenzoate. The product, poly(decahydronaphthalene-2,6-dimethylene 4,4'-bibenzoate/dodecahydro-4,4'-bibenzoate), 90/10 mol percent, has a polymer melting temperature of 250° C. and an intrinsic viscosity of 0.5. Films melt pressed from the resulting polymer exhibit enhanced dyeability with 1,4 - diamino - 2,3 - dichloroanthraquinone and other disperse dyes as contrasted with the corresponding homopolyester of Example 2. Fibers produced from this polymer by melt spinning and drawing have a TSR of 77% and exhibit enhanced dyeability with 1,4-diamino-2,3-dichloroanthraquinone as contrasted with fibers of the homopolyester.

EXAMPLE 6. — POLY(DECAHYDRONAPHTHALENE - 2,6 - DIMETHYLENE 1,4 - BICYCLO [2.2.2]OCTANEDICARBOXYLATE)

Into a small polymer tube is placed 10 g. of dimethyl 1,4-bicyclo(2.2.2)octanedicarboxylate (0.044 mol), 14.8 g. of decahydro - 2,6 - bis(hydroxymethyl)naphthalene (0.075 mol), and 5 drops of the NaHTi(OBu)$_6$ catalyst solution of Example 2. The ingredients are melted and a capillary for nitrogen flow is inserted into the polymer tube. Ester exchange is carried out for 2 hours at 220–230° C., after which the temperature is raised to 280° C. and vacuum is applied gradually until the pressure is reduced to 0.5 mm. of mercury. After 4 hours at this temperature, a white solid having an intrinsic viscosity of about 0.5 and a polymer melting temperature of 250° C. is produced.

The polymeric material prepared as described above is powdered and then heated for 5 hours under a stream of nitrogen at 250° C. At the conclusion of this solid phase polymerization reaction, the intrinsic viscosity of the polymer is 0.6 and the polymer melting temperature is 255° C. The polymer can be formed into fibers and films which are tough and flexible after orientation.

EXAMPLE 7. — POLY(DECAHYDRONAPHTHALENE-2,6-DIMETHYLENE 4,4' - SULFONYLDIBENZOATE)

Into a small polymer tube is placed 2.4 g. of bis(4-carbomethoxyphenyl) sulfone (0.0072 mol), 2.4 g. of decahydro-2,6-bis(hydroxymethyl)naphthalene (0.012 mol), and 2 drops of the NaHTi(OBu)$_6$ catalyst solution of Example 2. The ingredients are melted and a capillary for nitrogen flow is inserted into the polymer tube. Ester exchange is carried out for 2 hours at 220–230° C., after which the temperature is raised to 260° C. and vacuum is applied gradually until the pressure is reduced to 0.5 mm. of mercury. After 4 hours at this temperature, an amber solid having an intrinsic viscosity of about 0.4 and a polymer melting temperature of 210° C. is produced.

The polymeric material prepared as described above is powdered and then heated for 4 hours under a stream of nitrogen while the temperature of the nitrogen is gradually increased from 190° C. to 210° C. At the conclusion of this solid phase polymerization reaction, the intrinsic viscosity of the polymer is 0.5 and the polymer melting temperature is 220° C. Fibers can be pulled from the melt and the polymer can also be melt pressed into flexible films.

EXAMPLE 8.—POLY(DECAHYDRONAPHTHALENE-2,6-DIMETHYLENE TEREPHTHALATE)

Into a small polymer tube is placed 4.5 g. of dimethyl terephthalate (0.023 mol), 7.8 g. of decahydro-2,6-bis(hydroxymethyl)naphthalene (0.04 mol), and 5 drops of the NaHTi(OBu)$_6$ catalyst solution of Example 2. The ingredients are melted and a capillary for nitrogen flow is inserted into the polymer tube. Ester exchange is carried out for 2 hours at 220–230° C., after which the temperature is raised to 260° C. and vacuum is applied gradually until the pressure is reduced to 0.5 mm. of mercury under a continuous slow stream of nitrogen. After 4 hours at this temperature, a white solid having an intrinsic viscosity of about 0.5 and a polymer melting temperature of 165° C. is produced.

The polymeric material prepared as described above is powdered and then heated for 5 hours under a stream of nitrogen while the temperature is gradually increased from 165° C. to 210° C. At the conclusion of this solid phase polymerization reaction, the intrinsic viscosity of the polymer is 0.5 and the polymer melting temperature is 210° C. Orientable fibers and films can be formed from the molten polymer.

EXAMPLE 9.—COPOLYESTER CONTAINING 8 MOL PERCENT TETRAMETHYLENE GLYCOL

A 70/30 mol percent glycol mixture of decahydro-2,6-bis(hydroxymethyl)naphthalene (10 g., 0.05 mol) and tetramethylene glycol (1.96 g., 0.021 mol) is charged into a polymer tube together with 11.5 g. (0.042 mol) of dimethyl 4,4'-bibenzoate and 5 drops of the NaHTi(OBu)$_6$ catalyst solution of Example 2. Ester interchange is carried out at 220–230° C. for 2 hours, after which the temperature is raised to 260° C. and vacuum is applied gradually until the pressure is reduced to 0.5 mm. of mercury. A continuous slow stream of nitrogen is maintained through the tube. After 4 hours at this temperature, a white solid having an intrinsic viscosity of 0.6 and a polymer melting temperature of 265° C. is produced.

The glycol volatilized during the polymerization reaction is condensed, collected, and analyzed. The distillate amounts to 3.0 g. and comprises 15% decahydro-2,6-bis(hydroxymethyl)naphthalene and 54% tetramethylene glycol, the remainder being dimethyl bibenzoate. The composition of the product is accordingly calculated to be poly(decahydronaphthalene-2,6-dimethylene/tetramethylene 4,4'-bibenzoate), 92/8 mol percent. Fibers produced from this polymer by melt spinning and drawing have a TSR of 67% and are more crystalline than fibers of the correspoding homopolymer as shown by X-ray analysis.

EXAMPLE 10.—COPOLYESTER CONTAINING 35 MOL PERCENT TETRAMETHYLENE GLYCOL

The general procedure of Example 9 is repeated, using a charge comprising a 40/60 mol percent glycol mixture of decahydro-2,6-bis(hydroxymethyl)naphthalene (5.0 g. 0.025 mol) and tetramethylene glycol (3.4 g., 0.038 mol) together with 10.0 g. (0.037 mol) of dimethyl 4,4'-bibenzoate. By analysis of the distillate it is determined that the composition of the polymeric product is poly-(decahydronaphthalene-2,6 - dimethylene/tetramethylene 4,4'-bibenzoate), 65/35 mol percent. The polymer melting temperature is 195° C. and the intrinsic viscosity is 1.0. Flexible films are melt pressed from the polymer.

EXAMPLE 11.—COPOLYESTER CONTAINING 25 MOL PERCENT HEXAHYDRO - p - XYLYLENE GLYCOL

The general procedure of Example 9 is repeated, using a charge comprising a 55/45 mol percent glycol mixture of decahydro-2,6-bis(hydroxymethyl)naphthalene (10.9 g.) and hexahydro-p-xylylene glycol (6.5 g.) together with 15.9 g. of dimethyl 4,4'-bibenzoate. By analysis of the distillate it is determined that the composition of the polymeric product is poly(decahydronaphthalene-2,6-dimethylene/hexahydro-p-xylylene bibenzoate), 75/25 mol percent. The polymer melting temperature is 225° C. and the intrinsic viscosity is 0.4.

EXAMPLE 12.—COPOLYESTER CONTAINING 10 MOL PERCENT HEXAHYDRO-p-XYLYLENE GLYCOL

The general procedure of Example 9 is repeated, using a charge comprising an 80/20 mol percent glycol mixture of decahydro-2,6-bis(hydroxymethyl)naphthalene (7.91 g.) and hexahydro-p-xylylene glycol (1.44 g.) together with 7.95 g. of dimethyl 4,4'-bibenzoate. By analysis of the distillate it is determined that the composition of the polymeric product is poly(decahydronaphthalene-2,6-dimethylene/hexahydro-p-xylylene bibenzoate), 90/10 mol percent. The polymer melting temperature is 225° C. and the intrinsic viscosity is 0.5

EXAMPLE 13.—COPOLYESTER CONTAINING 7 MOL PERCENT HEXAMETHYLENE GLYCOL

The general procedure of Example 9 is repeated, using a charge comprising an 85/15 mol percent glycol mixture of decahydro-2,6-bis(hydroxymethyl)naphthalene (8.41 g.) and hexamethylene glycol (0.89 g.) together with 7.95 g. of dimethyl 4,4'-bibenzoate. By analysis of the distillate it is determined that the composition of the polymeric product is poly(decahydronaphthalene-2,6-dimethylene/hexamethylene bibenzoate), 93/7 mol percent. The polymer melting temperature is 253° C. and the intrinsic viscosity is 0.3.

EXAMPLE 14. — POLY(DECAHYDRONAPHTHALENE-2,6-DIMETHYLENE 1,4-CYCLOHEXANE-BIS[METHYLENEOXY-4-BENZOATE]

Into a small polymer tube is placed 10.0 g. of 1,4-bis(4-carbomethoxyphenoxymethyl)cyclohexane (0.024 mol), 8.15 g. of decahydro-2,6-bis(hydroxymethyl) naphthalene (0.041 mol), and 5 drops of the NaHTi(OBu)$_6$ catalyst solution of Example 2. Ester exchange is carried out for 2 hours at 220–230° C., after which the temperature is raised to 250° C. and vacuum is applied gradually until the pressure is reduced to 0.5 mm. of mercury. A slow stream of nitrogen gas into the tube is maintained as in previous examples. After 4 hours during which the temperature is slowly raised to 270° C., a white solid having an intrinsic viscosity of 0.35 and a polymer melting temperature of 268° C. is produced. Orientable fibers and films are produced from the molten polymer.

EXAMPLE 15. — POLY(DECAHYDRONAPHTHALENE-2,6-DIMETHYLENE 4,4' - STILBENEDICARBOXYLATE)

Into a small polymer tube is placed 2.5 g. of dimethyl 4,4'-stilbenedicarboxylate (0.0088 mol), 2.8 g. of decahydro-2,6-bis(hydroxymethyl)naphthalene (0.0142 mol), and 3 drops of the NaHTi(OBu)$_6$ catalyst solution of Example 2. Ester exchange is carried out for 2 hours at 220–230° C., after which the temperature is raised to 250° C. and vacuum is applied gradually until the pressure is reduced to 0.5 mm. of mercury. After 4 hours of polymerization under this pressure and temperature with a continuous slow stream of nitrogen through the tube, a white solid having an intrinsic viscosity of 0.25 and a polymer melting temperature of 253° C. is produced. Flexible films are melt pressed from the polymer.

EXAMPLE 16. — POLY(DECAHYDRONAPHTHALENE-2,6-DIMETHYLENE m-TERPHENYL-4,4''-DICARBOXYLATE)

Into a small polymer tube is placed 10.0 g. of dimethyl m-terphenyl-4,4''-dicarboxylate (0.029 mol), 9.7 g. of decahydro-2,6-bis(hydroxymethyl)naphthalene (0.049 mol), and 5 drops of the NaHTi(OBu)$_6$ catalyst solution of Example 2. Ester exchange is carried out for 2 hours at 220–230° C., after which the temperature is raised to 250° C. and vacuum is applied gradually until the pressure is reduced to 0.5 mm. of mercury. The temperature is slowly raised to 280° C. during 4 hours while the polymerization is carried out at 0.5 mm. of mercury under a continuous slow stream of nitrogen through the tube. Flexible films are pressed from the resulting white solid, which has an intrinsic viscosity of 0.4 and a polymer melting temperature of 188° C.

EXAMPLE 17.—PREPARATION AND PURIFICATION OF A PURE GEOMETRIC ISOMER OF DECAHYDRO-2,6-BIS(HYDROXYMETHYL) NAPHTHALENE 100 grams of dimethyl decahydro-2,6-naphthalenedicarboxylate, prepared as described in part A of Example 1, is dissolved in 1 liter of a mixture of 80 parts by volume of water and 20 parts by volume of ethanol. To the solution is added 33 g. of sodium hydroxide, after which it is refluxed overnight and the ethanol is distilled off. When the solution is acidified with dilute hydrochloric acid, a precipitate forms which is filtered off, washed with distilled water, and dried. The product, decahydro-2,6-naphthalenedicarboxylic acid, amounts to 86 g. and has a melting point of 210–222° C.

The acid is isomerized by placing it in a container under a vacuum of 15 mm. of mercury and heating for one hour at 200° C., one hour at 250° C., and finally for one hour at 300° C.

A solution of 13 g. of the isomerized acid is treated with an excess of diazomethane in ether, after which the ether is evaporated. When a sample of the resulting dimethyl ester is subjected to vapor phase chromatography, nearly all the material is found in a single peak and it is concluded that 95% of the product is in the form of single geometric isomer of dimethyl decahydro-2,6-naphthalenedicarboxylate. The dimethyl ester is recrystallized from a solvent comprising equal parts of methanol and pentane. The recrystallized product melts at 80–82° C. and vapor phase chromatography of a sample establishes that all of the material passes through in a single peak, indicating that the material is a pure geometric isomer.

The procedure described in part A of Example 1 for reducing dimethyl decahydro-2,6-naphthalenedicarboxylate to decahydro-2,6-bis(hydroxymethyl)naphthalene with lithium aluminum hydride is repeated, using the pure geometric isomer of the dimethyl ester prepared as described above. After recrystallization, the glycol has a melting point of 123–125° C. Vapor phase chromatography indicates that the glycol is a single pure geometric isomer, since only one peak is found.

Since many different embodiments of the invention may be made without departing from the spirit and scope thereof, it is to be understood that the invention is not limited by the specific illustrations except to the extent defined in the following claims.

I claim:
1. A polymeric fiber-forming linear polyester of components consisting essentially of a glycol and polyacid, said glycol being selected from the group consisting of decahydro-bis-(hydroxymethyl)naphthalene, having the formula

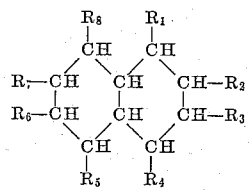

wherein two of the R substituents are —CH$_2$OH and the remainder are hydrogen and mixtures of said decahydro-bis(hydroxymethyl)naphthalene with up to 50% of a saturated glycol containing 2 to 10 carbon atoms, said polyacid having the formula A(COOH)$_2$, wherein A is a divalent organic radical containing from 6 to 24 carbon atoms and inert in esterification reactions, A being composed primarily of carbon and hydrogen and being free from nonhydrocarbon components other than halogen and chalkogen, A further containing at least one 6-membered carbocyclic nucleus and the carbonyl groups being separated by a chain of at least three nuclear carbon atoms.

2. A polyester as in claim 1 wherein the glycol component is decahydro-2,6-bis(hydroxymethyl)naphthalene and the polyacid component is a mixture of dimethyl 4,4'-bibenzoic acid and sodium 3,5-di(carboxy)benzenesulfonate.

3. A polyester as in claim 1 wherein the glycol component is decahydro-2,6-bis(hydroxymethyl)naphthalene and the polyacid component is a mixture of dimethyl 4,4'-bibenzoic acid and dimethyl dodecahydro-4,4'-bibenzoic acid.

4. A polyester as in claim 1 wherein the glycol component is a mixture of decahydro-2,6-bis(hydroxymethyl)naphthalene and tetramethylene glycol and the polyacid is dimethyl 4,4'-bibenzoic acid.

5. A polyester as in claim 1 wherein the glycol component is a mixture of decahydro-2,6-bis(hydroxymethyl)naphthalene and hexahydro-p-xylylene glycol and the polyacid is dimethyl 4,4'-bibenzoic acid.

6. A polyester as in claim 1 wherein the glycol component is a mixture of decahydro-2,6-bis(hydroxymethyl)naphthalene and hexamethylene glycol and the polyacid is dimethyl 4,4'-bibenzoic acid.

7. Polymeric poly(decahydronaphthalenedimethylene 4,4'-bibenzoate).

8. Polymeric poly(decahydronaphthalene-2,6-dimethylene 4,4'-bibenzoate).

9. Polymeric poly(decahydronaphthalene-2,6-dimethylene 1,4-bicyclo[2·2·2]-octanedicarboxylate).

10. Polymeric poly(decahydronaphthalene-2,6-dimethylene 4,4'-sulfonyldibenzoate).

11. Polymeric poly(decahydronaphthalene-2,6-dimethylene terephthalate).

12. Polymeric poly(decahydronaphthalene-2,6-dimethylene 1,4-cyclohexane-bis[methyleneoxy-4-benzoate]).

13. Polymeric poly(decahydronaphthalene-2,6-dimethylene 4,4'-stilbenedicarboxylate).

14. Polymeric poly(decahydronaphthalene-2,6-dimethylene m-terphenyl-4,4''-dicarboxylate).

15. The fiber-forming linear polymeric polyester consisting essentially of poly(decahydronaphthalene-1,4-dimethylene 4,4'-bibenzoate).

16. The fiber-forming linear polymeric polyester consisting essentially of poly(decahydronaphthalene-2,7-dimethylene 4,4'-bibenzoate).

References Cited
UNITED STATES PATENTS 3,007,900   11/1961   Lytton et al. _____ 260—75

OTHER REFERENCES

Bailey et al.: J. Am. Chem. Soc., vol. 77, pp. 990–1 (1955).

Bailey et al.: J. Am. Chem. Soc., vol. 81, pp. 5598–5601 (1959).

Chem. Abstracts, vol. 56, p. 22N (1962).

Dauben et al.: J. Am. Chem. Soc., vol. 83, p. 4658 (1961).

Lock et al.: Ber. Deut, Chem. Ges., vol. 75B, pp. 1161–62 (1942).

Lock et al.: Ber. Deut, Chem. Ges., vol. 84, p. 639 (1951).

Ried et al.: Ber. Deut, Chem. Ges., vol. 83, pp. 398–9 (1950).

Weygand et al.: Ber. Deut, Chem. Ges., vol. 89, pp. 710–711 (1956).

WILLIAM H. SHORT, *Primary Examiner.*

L. P. QUAST, *Assistant Examiner.*